July 25, 1933.　　　C. J. BLAKESLEE　　　1,919,925
WHEEL
Filed Nov. 18, 1931　　2 Sheets-Sheet 1
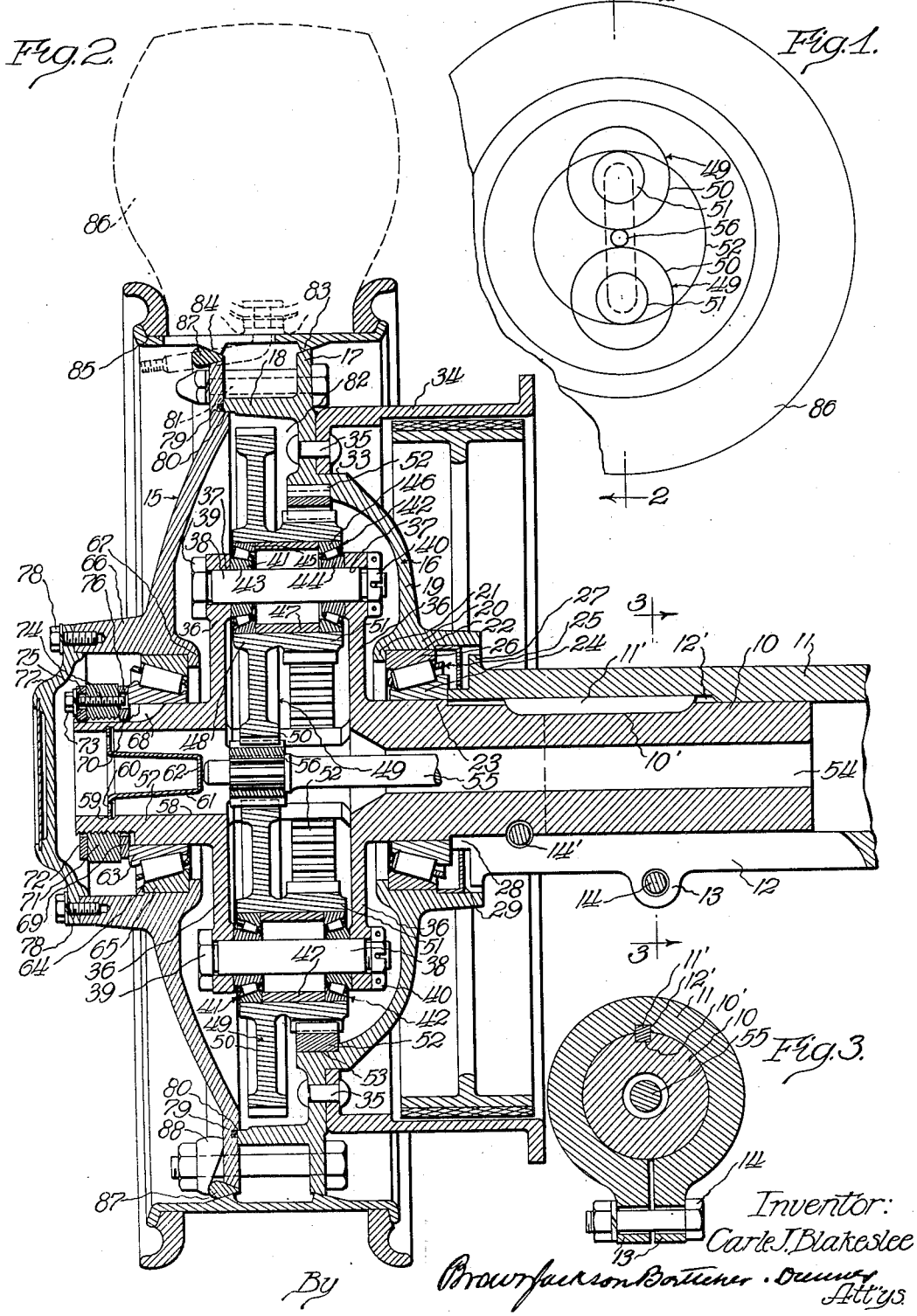
Inventor:
Carl J. Blakeslee
By Brown Jackson Boettcher Dienner
Att'ys July 25, 1933.  C. J. BLAKESLEE  1,919,925
WHEEL
Filed Nov. 18, 1931  2 Sheets-Sheet 2

Inventor:
Carle J. Blakeslee
By Brown Jackson Bottcher & Dunner Attys.

Patented July 25, 1933

1,919,925

UNITED STATES PATENT OFFICE

CARLE J. BLAKESLEE, OF CHICAGO, ILLINOIS, ASSIGNOR TO WALKER VEHICLE COMPANY, OF CHICAGO, ILLINOIS, A CORPORATION OF ILLINOIS

WHEEL

Application filed November 18, 1931. Serial No. 575,699.

This application is a continuation in part of my co-pending application, Serial No. 499,173, filed December 1, 1930.

The present invention relates to wheels and more particularly to driving wheels for trucks and the like where a relatively great reduction in speed and consequently increased torque are desired. The herein disclosed wheel is particularly well adapted for electrical vehicles but it may also be employed for vehicles employing other forms of motive power.

Where a relatively large reduction in speed between the driving engine or electric motor and the propelling wheels is desired it is not desirable to embody the entire reduction in the differential because of the requirement for an unusually large ring gear. This would in turn require an objectionably large and heavy axle housing, and in order to avoid such construction various forms of double reduction-gear drives have been proposed in which the first reduction takes place in the bevel gears in the center of the axle and the second reduction is obtained by gear means in the rear wheels.

One drive of this type which has proven successful is the so-called Walker Drive for embodying the gear reduction, or a large part of the same, in the traction wheels. In the form employed by my assignee a stub axle is inserted into the end of the axle housing. The axle housing carries a driving motor and/or differential with spindles extending to each stub axle. The stub axle carries preferably a pair of idlers on bearings supported by the stub axle, the corresponding driving spindle having a pinion meshing with the idlers. The idlers in turn mesh with an internal ring gear which has heretofore formed substantially the outer periphery of the wheel in order to obtain the desired gear reduction. The body of the wheel has been formed of a pair of opposed discs, mounted centrally on bearings on the stub axle and peripherally being clamped or riveted together through the ring gear. Where, as in the Walker balanced drive, two idlers are employed the pinion needs no bearing support as its support is gained from the idlers which are in fixed mesh with the internal ring gear.

According to my invention as more completely set forth in the parent application identified above and of which this application is a continuation in part, I have provided certain marked improvements in a structure embodying a compound gear reduction in the drive wheels and improvements in the mode of operation thereof, for details of which reference may be had to the parent case. Briefly, such improved features and results secured included a greater gear reduction in the same diametrical dimensions of the driving wheels and associated axle structure, the diameter of the driving wheels being thus particularly adapted to the use of balloon tires or other tires of considerable size, a gear drive construction in which the internal ring gear may be enclosed without the use of bolts or rivets therethrough, the provision of a pocket or annular space disposed radially outwardly of the operating gears to trap any chips, grit or other impurities which may inadvertently or accidentally be included within the driving wheels, a better and more easily obtained seal for the periphery of the two joined wheel members, a construction of the wheel discs or members in which the outer peripheries thereof may be formed to adapt them to the desired wheel rim without interfering with the seal therebetween, a stronger bearing support for the wheel and a construction in which the loads imposed upon the wheel rims are transmitted directly to the wheel discs and through them directly to the separate bearing means supporting the wheel on the axle, and a construction in which the brake drums of the wheels are connected to the same wheel member to which the internal ring gears are connected, so that the braking stresses do not act upon the bolts or other means holding the wheel discs together or the means holding the disc or discs to the ring gear.

The features to which this application is particularly directed are those relating to the wheel structure per se. In this connection it must be kept in mind that the wheel structure must be such to accommodate the reduction gear drive and yet be such that the overall dimensions are small enough to provide for the expeditious employment of balloon tires of comparatively small overall diameter, such as those which may be advantageously employed on slow moving vehicles, and comparatively large size to provide adequate cushioning against road shocks. Other objects and advantages of the present invention will be apparent to those skilled in the art after a consideration of the following detailed description, taken in conjunction with the accompanying drawings, in which:

Fig. 1 is a fragmentary elevation of a wheel illustrating more or less diagrammatically the relative positions of the compound gear reduction mounted within the confines of the wheel body;

Fig. 2 is an enlarged cross section taken along the line 2—2 of Fig. 1 and illustrating in detail the disc members forming the wheel body and their separate bearing support upon the axle, together with a single tire carrying rim supported on the peripheral portions of the wheel discs;

Fig 3 is a section taken along the line 3—3 of Fig. 2; and

Figure 4:
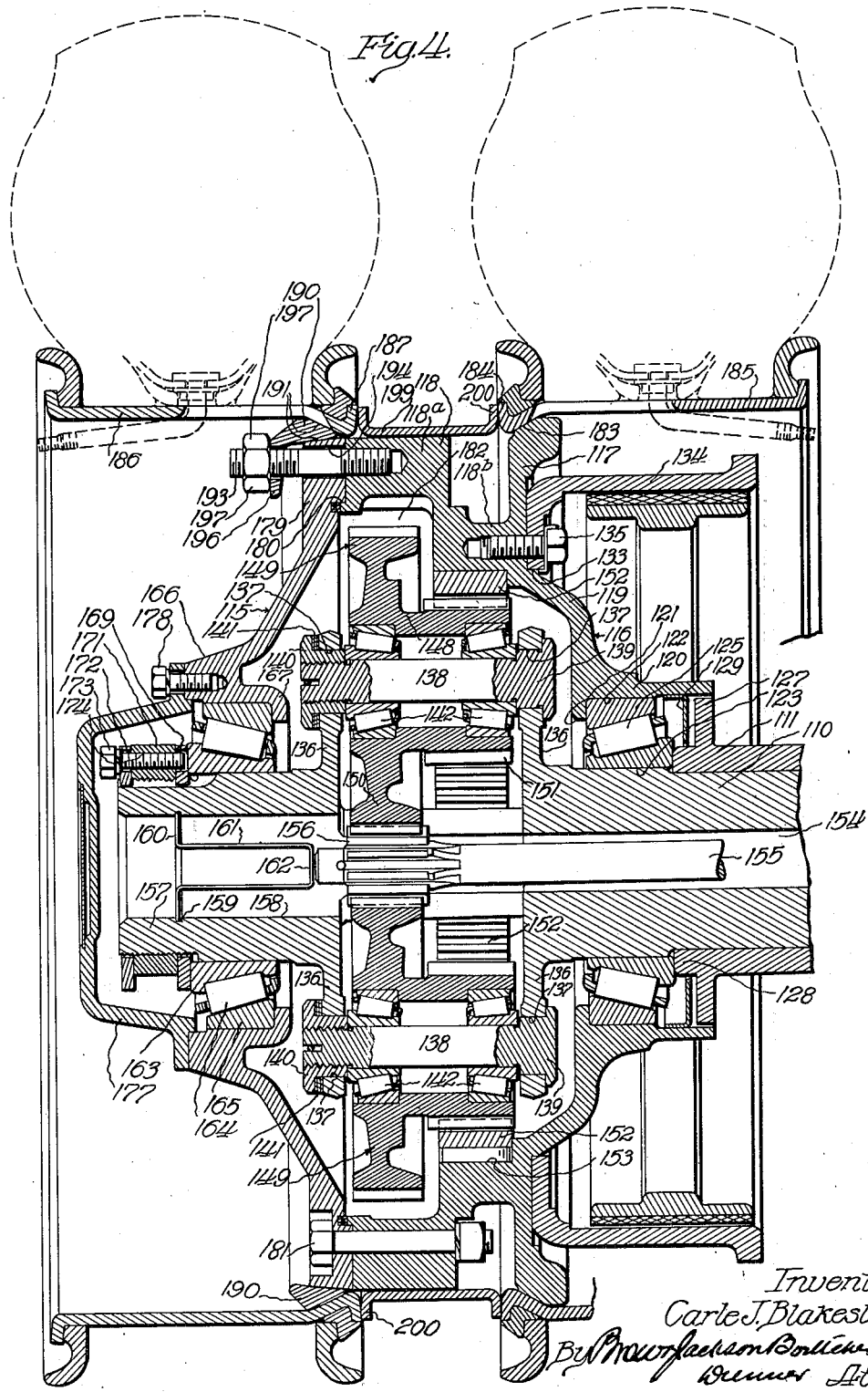
Fig. 4 is a section corresponding to the cross section shown in Fig. 2 and illustrating a slightly modified construction in which the wheel body including the wheel discs are particularly adapted for mounting dual rims thereon, Fig. 4 also illustrating a slightly modified form of adjusting means for the idler pinion bearings.

Referring now more particularly to the accompanying drawings, in the embodiment of the invention disclosed in Fig. 2, the wheel and its associated structure are suitably supported upon a tubular, non-rotatable stub axle 10 having a shank portion thereof extending into the end of an axle housing 11, having the outer end thereof slotted to form a split clamp 12, and having a pair of clamping ears 13 which are drawn together by a bolt 14. Along its upper side the stub axle is provided with a key seat 10′ accommodating a key 11′ cooperating with a keyway 12′ in the upper inner periphery of the main axle housing 11, to prevent rotation of the axle 10 relative to housing 11. Adjacent the outer end of housing 11 a second bolt 14′ passing through a transverse groove in the under side of axle 10 and a cooperating transverse bore in housing 11 is adapted to aid the clamping action of bolt 14 and simultaneously serves as a cross key or pin to prevent longitudinal displacement of axle 10.

The wheel or wheel body of Fig. 2 is itself comprised of two opposed dished discs or disc members 15 and 16, the former being the laterally outer disc member and the latter the laterally inner disc member. The inner disc 16 is provided with a flat peripheral flange portion 17 having extending therefrom and laterally outwardly toward the outer disc 15 a cylindrical flange 18 adjacent the outermost periphery thereof. Between the outermost periphery and the central portion thereof the disc 16 is provided with a convex or dished portion 19 which terminates at the central portion in a cylindrical bearing flange 20, provided at its inner end with a radially extending flange 21, providing a suitable annular seat 22 to receive the outer race of anti-friction bearing means 25.

On its outer periphery and in opposed relation to the annular seat 22, the stub axle 10 is provided with an enlarged portion 23 forming a seat for the inner race 24 of a tapered roller anti-friction bearing 25, the outer race 26 thereof being seated in the annular seat 22 as mentioned above. An integral peripheral flange 27 formed adjacent the outer end of housing 11 is adapted to fit into the outer end of the flange 20 of disc 16, the extreme outer end of housing 11 being provided with a reduced portion 28 adapted to act as an inward abutment for the inner race 24 of roller bearing 25 and resting against a shoulder at the end of the seat 23. To prevent the access of dirt or other foreign matter to the bearing 25 and to retain any lubricant which finds its way through the bearing 25 to the outer side thereof, a cupped ring 29 is frictionally seated in the inner periphery of the flange 20 of the disc 16 and supports therein in contact with the reduced neck 28 a felt ring, not shown. It will be readily apparent that the reduced end 28 precludes outward displacement of the inner race 24 of bearing 25 by providing in assembled position of the axle 10 within the main axle housing 11 a fixed abutment therefor.

At the juncture of the convex or dished portion 19 of the disc 16 with the straight flange 17 an outer peripheral seat 33 is provided to accommodate the inner flange periphery of a brake drum 34 suitably secured to the straight flange portion 17 as by means of rivets 35, the brake drum 34 suitably accommodating an internal expanding brake in any suitable or desired manner. The brake drum is attached to the same disc as that to which the ring gear is connected but outside the same. This is advantageous in that if the power and the brake are simultaneously active it will not tend to wrench the wheel. In radially opposed relation and adjacent the outer end thereof, the stub axle 10 is provided with integral, parallel, outwardly extending arms or plate-like bearing bracket portions 36. These arms are bearing brackets are formed as an integral part of the forging of which the stub axle is composed or they may be separately formed and joined to the stub axle portion as by fusion welds or in any other manner desired. These plate-like portions or arms 36 afford great strength against forces acting circumferentially of the stub axle 10 but afford only limited resistance to deflection axially of the stub axle 10. Adjacent the apex of each bracket portion 36 there is provided a suitable hole 37, the holes of each pair of opposed plate-like portions 36 being in alignment to accommodate a pin or journal member 38 provided at one end thereof with a polygonally shaped head 39 and having its other end formed to accommodate a castellated nut 40, whereby the opposed pair of plate-like members 36 may be drawn toward each other for adjustment of the bearings. Each journal member 38 supports a pair of tapered roller bearings 41 and 42, the inner races 43 and 44 of which have their outer sides in engagement with the inner faces of the bosses formed on the ends of the bracket members 36. The outer races 45 and 46 of the bearings 41 and 42 are maintained in definite spaced relationship by means of a bushing 47 forced into the inside of the compound gear by a press fit.

The outer races 45 and 46 of the bearings 41 and 42 engage the inner periphery of the hub portion 48 of the compound idler gear 49 comprising a gear part 50 and pinion part 51 preferably formed integrally in concentric arrangement on hub portion 48. Pinion 51 of gear pinion 49 meshes with an internal ring gear 52 suitably keyed or pinned in a suitable annular seat 53 formed at the inner side of the disc 16 at the juncture of the dished portion 19 and the straight flange 17.

It will be readily apparent that, since the plate-like bracket members or arms 36 are somewhat resilient laterally, the bearings 41 and 42 may be readily taken up by drawing up on the nut 40, thereby drawing the inner races 43 and 44 of the bearings 41 and 42 respectively toward each other, the outer races 45 and 46 remaining in positive spaced relationship during such drawing up action. Thus accurate adjustment in the initial assembly, or to take up any possible wear is provided, and a quiet drive assured.

The stub axle 10 is preferably formed from round bar stock suitably drilled and machined to provide a centrally disposed axial bore 54 which accommodates a shaft or spindle 55 suitably connected through a differential with the usual driving motor (not shown) at one end, the outer end thereof being provided with a pinion 56 suitably keyed thereto. Pinion 56 meshes with the teeth of the gear portions 50 of the idler gear pinions 49 thereby transmitting propelling power from the motor to the ring gear 52, the latter in turn transmitting such power to the disc 16. The gear pinion cages are preferably formed by milling out upper and lower openings in stub axle 10 and then welding the plate-like portions 36 to the stub axle along the longitudinally opposed edges defining the openings in diametrically opposed relation.

The outer end of the stub axle 10 is formed with a portion 57 having a bore 58 of larger internal dimension than the bore 54 and is provided adjacent its extreme outer end with an annular groove 59 into which the yielding opposed flanges 60 of a substantially U-shaped retaining member 61 are adapted to be seated, the end 62 of which is disposed in proximity to the extreme outer end of the shaft 55, thereby preventing axial displacement outwardly of said shaft 55. The outer periphery of the enlarged portion 57 carries thereon the inner race 63 of a tapered roller bearing 64. The outer race 65 of this bearing is seated in the inner periphery of the hub portion 66 of the disc 15 and in abutment with a radial flange 67.

The extreme outer end of the enlarged portion 57 of the stub axle 10 is slightly reduced and threaded and along its upper side is provided with an axially extending key slot 68. An inner ring 69 formed with a radially inwardly extending lip 70 is slipped over the threaded end of the enlarged portion 57 of the stub axle 10, with the lip 70 disposed in the key slot 68, and its inner face is adapted to abut against the outer face of the inner race 63 of the roller bearing 64. A suitable ring nut 71 is then threaded over the threaded end of the enlarged portion 57 of the stub axle 10, thereby drawing up on the inner race 63 of the bearing 64, which thereby adjusts both bearings 25 and 64. A ring 72 similar in character to ring 69 is then slipped over the end of the enlarged portion 57 of the stub axle 10 and a screw 73 is then screwed into a threaded recess 74 provided in the ring nut 71 and passes through one of a plurality of recesses 75 provided in the ring or washer 72 and into but not through one of a plurality of similar recesses 76 provided in the ring or washer 69, thereby suitably interlocking the ring nut 71 with the enlarged portion 57 of the stub axle 10. A plurality of screws 73 may be provided if desired.

The outer end of the hub portion 66 of the disc 15 is suitably sealed by a hub cap 77 suitably secured to the end of the hub 66 as by means of bolts 78.

The straight flange portion 79 of the disc 15 is provided at its inner face with an annular seat 80 and a piloting shoulder to receive the free edge of the laterally extending flange 18 of the disc 16. The flange portion 79 is provided with a sealing groove containing packing of any suitable character. The two discs are clamped together by bolts 81 which may be provided with spacing collars to limit the bending stress upon the outer margins of the flanges 17 and 79. The bolts 81 extend through the radial flanges 17 and 79 outside the lateral flange 18 so that when drawn up a fluid tight annular chamber 82 is provided.

The peripheral portion of the straight flange 17 is formed on a taper outwardly of the wheel to accommodate a similarly tapered internal flange 83 on a rim 85 carrying a suitable pneumatic tire 86 in any preferable or desired manner. The rim 85 is secured to the wheel by means of a clamping ring 87 which is tapered to provide wedging means cooperating with the inwardly tapered periphery of the flange 79 of the disc 15 and with the oppositely tapered internal flange 84 on the rim 85. The clamping ring 87 is preferably retained in position by the usual clamping lugs 88.

While I have shown in Fig. 2 only a single rim carried by the flanges 17 and 79 it will be apparent that dual rim means may be mounted on these flanges if desired. In either case, it is important to note that, by virtue of the flanges 83 and 84 and the ring 87, the loads imposed on the rim 85 are transmitted directly to the disc members 15 and 16 and, by them, are transmitted directly to the separate bearings 25 and 64. The same is true if dual rim means is mounted on the flanges 17 and 79, and it is also true that in either case the loads are approximately equally divided between the disc members. In other words, the central plane of the wheel means, whether that be a single rim as shown at 85 in Fig. 2 or a dual rim construction, substantially coincides with the central plane of the wheel body which passes substantially midway between the flanges 17 and 79. It will also be observed that the bearings 25 and 64 are positioned on opposite sides of this last named plane and also that the driving pinion 56 is disposed adjacent this plane. By virtue of this construction an extremely sturdy wheel is produced which can effectively take very heavy loads. It will also be observed that the brake drum 34 is secured to the disc member 16 to which the driving ring gear 52 is secured, these two members being secured to the laterally inner disc member at adjacent points thereon.

By virtue of the connecting bolts 81 of the two disc members 15 and 16 are effectively connected together to form a substantially rigid wheel body, the dished portions of the disc members forming an interior space to accommodate the reduction gearing carried by the axle 10. The annular chamber or space 82 provides a trap disposed concentrically outwardly of the internal ring gear 52 so that grit, dirt, caked grease and gear chips as are thrown outwardly by centrifugal force will be collected at a portion of the wheel other than at or adjacent the ring gear, thereby materially increasing the efficiency and life of the internal gear arrangement associated therewith.

By virtue of the disc members 15 and 16 being rigidly connected together substantially as an integral unit by the bolts 81 and inasmuch as the inner race 24 of the bearing 25 abuts the end of reduced portion 28, it will be clear that upon drawing up on the inner race 63 of the bearing 64 by means of the ring nut 71, the bearings 25 and 64 may both be readily adjusted when required.

I have found that in practice the internal drive wheel structure illustrated may be satisfactorily constructed to provide a ratio of 18 33 to 1, such provision being readily adaptable for the driving of electrically propelled vehicles of the class deriving energy from storage batteries in an efficient manner. By employing tapered roller bearings for anti-frictionally supporting the gear pinions and providing take-up thereof by virtue of the lateral yieldability of plate-like portions 36, adjustments for wear may be quickly and readily accomplished.

It will be of course understood that the driving parts are first assembled upon the stub axle 10, then the latter with the driving parts are assembled within the wheel, next the stub axle with the wheel thereon is mounted within the housing, and lastly the wheel bearings 25 and 64 are adjusted.

Referring now more particularly to Fig. 4 which illustrates a type of dual rim wheel construction which is particularly adapted to mount a pair of rims in spaced apart relationship whereby greater loads can be transported conveniently. In this construction the stub axle and associated parts are somewhat heavier than is indicated in Fig. 2 and this entails some slight changes in the gear reduction mechanism, particularly as to the mounting of the idler gears on the fixed axle. In Fig. 4, also, slightly different means is illustrated as securing the disc members together. One reason for this is that the two disc members comprising the wheel body are maintained with their flanges somewhat farther apart than is illustrated in Fig. 2, since it is desired to mount a tire carrying rim separately on each of the flanges so that the loads imposed on the rims are transmitted directly to the disc member and to its associated bearing means. In this case spacing means of any suitable form is employed to maintain the rims in proper spaced apart relation. The disc members 15 and 16 shown in Fig. 2 may support, if desired, separate tire carrying rims, one on each of the peripheral flanges 17 and 79 with suitable spacing means between the rims, but the form illustrated in Fig. 4 is preferable for dual rim wheels because it provides a somewhat better mounting for the two tires.

Referring now particularly to Fig. 4 a non-rotatable stub axle 110 is provided with a suitable shank portion extending into the end of an axle housing 111 of any suitable form. Preferably, the axle housing 111 is suitably slotted to form a split clamp in substantially the same manner as is illustrated in Fig. 2.

The wheel body illustrated in Fig. 4 comprises two opposed discs or disc members 115 and 116 disposed respectively on the laterally outer side and the laterally inner side of the central plane of the wheel body. The inner disc member 116 is provided with a radially extending circumferential flange portion 117 having a suitably formed wedge surface at its periphery and a generally cylindrical laterally directed flange 118 extending toward the other disc member 115. To provide for receiving suitable securing means for the tire rims and the brake drum, as will be described later, the generally cylindrical flange portion 118 is formed with thickened sections 118a and 118d displaced one from the other a relatively small radial distance. Between the circumferential flange 117 and the central portion thereof the disc member 116 is provided with a laterally inwardly directed convex or dished portion 119 which terminates centrally in a cylindrical bearing flange 120 having a radially inwardly extending shoulder or flange 121 which cooperates with the flange 120 to form a suitable annular seat 122 to receive the outer race of anti-friction bearing means 125 of any suitable form. The inner race of the anti-friction bearing 125 is supported upon a seat formed by an enlarged portion 123 on the stub axle 110. An integral peripheral flange 127 formed adjacent the outer end of the axle housing 111 is adapted to fit into the outer end of the flange 120, the extreme outer end of the axle housing 111 being provided with a portion adapted to act as an inward abutment for the inner race of the roller bearing means 125. A cupped ring 129 is provided and which cooperates with a suitable felt ring (not shown) to prevent the entrance of dirt or other foreign matter to the bearing 125 and to retain the lubricant within the wheel.

At the juncture of the convex or dished portion 119 of the disc member 116 with the radial flange 117, an outer peripheral seat 133 is provided to accommodate and receive the inner flange of a brake drum 134. The brake drum is secured to the inner disc member 116 by stud bolts 135 of any suitable form threaded into suitable openings formed in the inner thickened section 118b of the laterally directed cylindrical flange 118. Cooperating with the brake drum 134 is an internal expanding brake of any suitable character. It is important, in this modification as in the form illustrated in Fig. 2, that the brake drum is attached to the same disc as that to which the ring gear, later to be described in detail, is connected. This is advantageous in that if the power and the brake are simultaneously active there will be no tendency to wrench the wheel.

The outer end of the stub axle 110 is provided with outwardly extending arms 136. These arms are comparatively short rigid members capable of resisting both axially directed and circumferentially directed forces. These arms or bearing brackets 136 may be formed as an integral part of the forging from which the stub axle 110 is formed or the arms may be attached to the stub axle 110 in any manner desired, as by welding.

The arms or brackets 136 are arranged on the stub axle 110 in diametrically opposed relation, and the outer ends of these arms are suitably apertured, as at 137, to accommodate a journal member 138 provided at one end with an enlarged head 139 and suitably threaded at its other end to accommodate a castellated adjusting nut 140. Interposed between the nut 140 and the adjacent arm or bracket 136 are a plurality of shims 141 by which the pair of tapered roller bearings 142 may be adjusted. By inserting or removing some of the shims 141 the inner races of the bearings 142 may be properly spaced apart to bring them to the proper adjustment. The outer races of the bearings 142 are received in suitable annular grooves formed in the hub portion 148 of a compound idler gear 149, whereby the gear is rotatably supported by the arms 136.

The idler gear 149, which forms a part of the driving means for the wheel body, comprises a gear portion 150 and a pinion portion 151. Preferably these portions are integrally formed with the hub 148, but obviously the gear and pinion may be separately formed if desired and secured to the hub in any desired manner. The pinion 151 meshes with an internal ring gear 152 suitably keyed, pinned or otherwise secured in any desired manner to the laterally inner disc member 116 in a suitable annular seat 153 formed in the thickened portion 118b on the inner side of the disc member 116 adjacent the juncture of the dished portion thereof 119 and the flange portion 117 and also adjacent the securing means for the brake drum 134.

The stub axle 110 is preferably formed from round bar stock and is suitably drilled and machined to provide a centrally disposed axial bore 154 to receive a driving shaft 155 suitably connected through a differential or the equivalent with the usual driving motor (not shown). The outer end of the driving shaft 155 is provided with a pinion 156 suitably keyed or otherwise secured thereto and this pinion meshes with the teeth of the gear portions 150 of the idler gears 149. Power is thus transmitted from the motor through the shaft 155 to the driving pinion 156, and from the driving pinion 156 the power is transmitted to the idler gears 149 and thence through the idler pinions 151 to the internal ring gear 152, whereby the wheel is driven. As pointed out above, the arms 136 which form cages for the idler gears 149 may be integrally formed with the stub axle 110, but preferably these parts are formed by milling out upper and lower openings in the stub axle 110 and then welding the arms or brackets 136 to the stub axle adjacent the openings in diametrically opposed relation. Obviously, other means and methods may be utilized in forming suitable rigid cages for the idler gears.

The outer end of the stub axle 110 is formed with a portion 157 having a bore 158 of larger internal dimensions than the bore 154 accommodating the driving shaft 155. The larger bore 158 is provided adjacent its extreme outer end with an annular groove 159 into which the yielding opposed flanges 160 of a retaining member 161 are adapted to be seated, the end 162 of which is disposed adjacent the extreme outer end of the driving shaft 155 for the purpose of preventing axial displacement outwardly of the driving shaft.

The outer portion 157 of the stub axle 110 is formed to provide a seat for the inner race 163 of the anti-friction bearing means 164 which supports the laterally outer disc member 115, the outer race 165 of the bearing 164 being seated in the inner periphery of the hub portion 166 of the disc member 115 and in abutment with a radial flange 167 formed thereon.

The extreme outer end of the enlarged portion 157 of the stub axle 110 is slightly reduced and threaded, and along one side thereof is provided with an axially extending key slot. An inner ring 169 is formed with a radially inwardly extending tongue or lip which is received within the slot to prevent the ring from turning on the reduced end of the portion 157. The inner face of the inner ring 169 is adapted to abut against the outer face of the inner race 163 of the roller bearing 164. A suitable ring nut 171 is then threaded over the reduced end of the enlarged portion 157 of the stub axle 110 whereby the inner and outer roller bearings 125 and 164 may be adjusted. A ring 172 similar in character to the ring 169 is then slipped over the end of the portion 157 of the stub axle 110, and a bolt or screw 173 is then threaded into a recess 174 provided in the ring nut 171. The bolt or screw 173 passes through one of a plurality of recesses provided in the ring 172, the threaded recess 174, and into but not through one of a plurality of recesses in the ring 169, thereby suitably interlocking the ring nut 171 with the threaded end of the stub axle 110. A plurality of screws 173 may be provided if desired.

The outer end of the hub portion 166 of the laterally outer disc member 115 is suitably sealed by a hub cap 177 effectively secured to the outer end of the hub 166 by any desired means, as by cap screws 178.

The two disc members 115 and 116 are suitably secured together to form a rigid structure or wheel body, and as best illustrated in Fig. 4, the dished portions extend outwardly from the central plane of the wheel body to provide widely spaced bearing points by which the wheel body is sturdily supported for rotation on the fixed stub axle. The laterally outer disc member 115 is provided with a radially extending flange portion 179 similar to the flange 117 on the laterally inner disc member 116. The flange portion 179 is provided on its inner face with an annular seat 180 to receive the free edge of the laterally extending generally cylindrical flange 118 formed on the other disc member. Preferably, the edge just mentioned is disposed adjacent the radially inner portion of the thickened section 118a of the flange 118. The seat 180 is provided with a groove to receive suitable packing sealing the free edge of the flange 118. The two disc members are clamped together by bolts 181 passing through suitable apertures formed in the flange 179 and the section 118a of the laterally directed flange 118 of the inner disc member 116. The bolts 181 extend outside the annular seat 180 and the associated packing so that a fluid tight joint between the two disc members 115 and 116 is secured.

The feature of radially offsetting the thickened sections 118a and 118b of the flange 118 provides in connection with the outer disc member 115 an annular chamber 182 which not only accommodates the idler gears 149 but also provides a space disposed radially beyond the gears 149 to receive any grit, dirt, caked grease and gear chips so that these harmful elements will be collected at a portion of the wheel away from the ring gear so that excessive wear between the ring gear and the associated pinions due to grit and the like will be prevented.

As previously mentioned, the peripheral portion of the radial flange 117 is formed with a wedge surface 183 thereon to receive the correspondingly formed radially inner wedge surface of the marginal gutter 184 of the inboard tire carrying rim 185. The outboard tire carrying rim 186 is substantially identical with the rim 185 and is likewise provided with a gutter 187 the radially inner portion of which is tapered to form a wedge surface. The laterally outer disc member 115 has its flange portion 179 formed with a slightly tapered peripheral edge which receives a suitable clamping ring 190 having radially inner and outer wedge surfaces 191 cooperating with the correspondingly formed radially outer and inner tapered or wedge surfaces formed on the flange 179 and on the gutter portion 187, respectively. The ring 190 is suitably mounted on stud bolts 193 threaded into the radially outer thickened flange section 118a and passing through an aperture 194 formed in the laterally outer flange 179. The ring 190 carries a suitable number of clamping ears 196 which are provided with openings whereby the ring may be mounted on the outer threaded ends of the stud bolts 193. Nuts 197 or other suitable means are provided on the laterally outer ends of the stud bolts 193 and when these nuts 197 are tightened the ring 190 is clamped against the laterally inner margin of the outboard rim 186. Suitable spacing means 199 is provided to maintain the rims 185 and 186 in proper spaced relation so that when the nuts 197 are tightened the two tire carrying rims are separately and individually supported by the respective disc members 115 and 116. As will be understood, the tightening of these nuts 197 forces the outboard rim 186 against the spacing means 199 and the spacing means is in turn forced against the inboard rim 185 whereby the latter is securely wedged upon the flange 117 of the inner disc member 116. Preferably the spacing means 199 is in the form of a ring having radially outturned margins 200, the latter being adapted to be seated against the inboard and outboard rims, respectively. Preferably, also, the spacing ring 199 is adapted to be centered on the outer circumference of the cylindrical flange 118 but any other suitable means for positioning the spacing ring may be provided if desired.

The mounting of the two tire carrying rims one on each of the disc members 115 and 116 forms an important feature of the present invention, particularly in view of the construction in which the bearings 125 and 164 are provided as separate supporting means for the respective disc members. Thus, the loads imposed on each of the rims are transmitted directly through the associated disc member to the separate bearing means on the axle. In this connection it is also important to note that the bearing 125 is positioned substantially in the plane of the inboard rim while the other bearing means 164 is disposed substantially in the plane of the outboard rim. This provides a construction which is extremely sturdy and one in which eccentric loads are reduced. It will also be observed that the driving pinion 156 is closely adjacent the central plane of the wheel body which passes substantially midway between the flanges 179 and 117 and the two tires carried, respectively, by the inboard and outboard rims 185 and 186.

While I have shown and described certain structural details in which the present invention is preferably embodied, it will be apparent that my invention is not to be limited to the specific means shown but that, in fact, widely different means may be employed in the practice of the broader aspects of the present invention as defined by the appended claims.

What I claim, therefore, and desire to secure by Letters Patent is:

1. In combination, a gear cage comprising a pair of spaced radially disposed members, journal means extending through said spaced members, anti-friction means carried by said journal means, means reacting against one of said members to adjust said anti-friction means, and a plurality of shims interposed between said means and the other member to vary said adjustment.

2. In combination, an axle, an axle shaft disposed therein for rotation relative thereto, a wheel comprising a pair of disc members, one of said members having a central dished portion and a radially flanged portion, means securing said disc members together in laterally spaced relation to form a substantially rigid wheel body, a ring gear disposed inwardly of said flanged portion and adjacent the juncture of said dished portion therewith, a gear cage carried by said axle, a pair of interconnected gears journaled for rotation on said gear cage, said interconnected gears including a gear member disposed between said disc members and driven from said axle shaft and said second interconnected gear member being of smaller diameter than said first interconnected gear member and disposed within said dished portion and in mesh with said ring gear, and a brake drum secured to said one disc member adjacent the radially flanged portion thereof and enclosing said dished portion.

CARLE J. BLAKESLEE.